US008669493B2

(12) United States Patent
Maurer et al.

(10) Patent No.: US 8,669,493 B2
(45) Date of Patent: Mar. 11, 2014

(54) ASSEMBLY FORMED BY AN ELECTRICALLY-HEATABLE GLAZING UNIT AND AN APPARATUS SENSITIVE TO MAGNETIC FIELDS

(75) Inventors: Marc Maurer, Saint Jean aux Bois (FR); Stefan Ziegler, Aachen (DE); Martin Melcher, Herzogenrath (DE)

(73) Assignee: Sanit-Gobain Glass France, Courbevoie (FR)

( * ) Notice: Subject to any disclaimer, the term of this patent is extended or adjusted under 35 U.S.C. 154(b) by 759 days.

(21) Appl. No.: 12/520,340

(22) PCT Filed: Dec. 21, 2007

(86) PCT No.: PCT/FR2007/052609
§ 371 (c)(1), (2), (4) Date: Jun. 19, 2009

(87) PCT Pub. No.: WO2008/087350
PCT Pub. Date: Jul. 24, 2008

(65) Prior Publication Data

US 2010/0006555 A1 Jan. 14, 2010

(30) Foreign Application Priority Data

Jan. 4, 2007 (DE) ......................... 10 2007 001 080

(51) Int. Cl.
*B60L 1/02* (2006.01)

(52) U.S. Cl.
USPC ........................................... 219/203; 219/202

(58) Field of Classification Search
USPC .......... 219/203, 426, 543; 343/909, 713, 704, 343/872; 428/155, 167
See application file for complete search history.

(56) References Cited

U.S. PATENT DOCUMENTS

| | | | | |
|---|---|---|---|---|
| 2,414,520 | A | 1/1947 | Greenwald | |
| 5,182,431 | A * | 1/1993 | Koontz et al. | 219/203 |
| 6,140,933 | A * | 10/2000 | Bugno et al. | 340/693.5 |
| 6,386,742 | B1 * | 5/2002 | DeLine et al. | 362/494 |
| 2004/0065651 | A1 | 4/2004 | Voeltzel | |
| 2004/0200821 | A1 * | 10/2004 | Voeltzel | 219/203 |
| 2006/0267856 | A1 | 11/2006 | Voeltzel | |
| 2007/0159396 | A1 * | 7/2007 | Sievenpiper et al. | 343/700 MS |
| 2007/0278200 | A1 | 12/2007 | Muromachi et al. | |

FOREIGN PATENT DOCUMENTS

| | | |
|---|---|---|
| EP | 1 684 546 | 7/2006 |
| GB | 1 202 522 | 8/1970 |
| JP | 58 16942 | 1/1983 |
| JP | 11 208421 | 8/1999 |

* cited by examiner

*Primary Examiner* — Henry Yuen
*Assistant Examiner* — Thomas Ward
(74) *Attorney, Agent, or Firm* — Oblon, Spivak, McClelland, Maier & Neustadt, L.L.P.

(57) ABSTRACT

In an electrically-heated glazing unit including a plurality of collector conductors configured to supply a plurality of heating conductors with an electric current used to heat up the heating conductors and the glazing unit, at least one partial region of the surface of the glazing unit includes an arrangement of parallel heating conductors in which the current flows in opposing directions. The arrangement of the heating conductors in the partial region of the surface is tuned to minimize by mutual compensation or eliminate the magnetic field acting locally within this partial region and perpendicularly to the plane of the glazing unit when the current flows. The operation of an apparatus sensitive to magnetic fields, for example a compass, in the immediate vicinity of the glazing unit thus becomes more reliable.

13 Claims, 3 Drawing Sheets

ASSEMBLY FORMED BY AN ELECTRICALLY-HEATABLE GLAZING UNIT AND AN APPARATUS SENSITIVE TO MAGNETIC FIELDS

TECHNICAL FIELD

This application relates to an assembly composed of an electrically-heatable glazing unit and of an apparatus sensitive to magnetic fields.

BACKGROUND

It has been known for a long time that glazing units and mirrors may be electrically heated by providing them an electrically-conducting coating and/or electrically-conducting tracks and by heating the coating and/or the conducting tracks by applying an electrical voltage and allowing a current to flow. The heat produced allows visual impairments caused by condensation of water vapour and/or frosting up or snow to be very quickly eliminated from such glazing units. On the glazing units of a vehicle, frozen windshield wipers can be freed up.

In the field of layered heaters for glazing units, an arrangement (U.S. Pat. No. 2,878,357) is known in which an electrically-conducting transparent coating on a glazing unit with a trapezoidal shape is divided into several strips disposed adjacent to one another which are electrically connected in series with one another by means of collector conductors respectively disposed alternately on the top and bottom edge of the strips. Thus, a voltage divider is produced; the same current flows in all the strips with different voltage drops. The result is that the total current that flows (equally in the short strips having relatively low resistances) is limited to the value that the strip with the highest resistance (where the voltage drop is the greatest) still allows to flow.

The Patent Application DE 36 44 297 A1 describes a series of variants which essentially consist in concentrating the heating power at certain locations on a coated glazing unit, divided collector conductors together with layered heating regions structured by separation lines and/or areas being presented as means to this effect. In relation to FIGS. 11A/B and 12A/B, it is also already indicated that different potentials or voltages opposing one another may be applied to various sections of the collector conductors.

One particular configuration of glazing units with heating wires can be seen in the Patent Application DE 103 52 464 A1. In one embodiment, the region with the heating wires in the outer lateral corner of a trapezoidal heated window is divided into three strips electrically connected in series in which the heating current circulates in alternating directions. An additional section of collector conductor is also unavoidably provided. However, as with the aforementioned US Patent, this division into regions is only used to render the heating power uniform in this lateral region.

The Patent U.S. Pat. No. 5,182,431 also already discloses an arrangement of discrete heating conductors (produced by a screen printing process or in the form of wires) in several parallel regions which, in order to control the preferential heating of one region of the surface, also comprises a series circuit composed of groups of heating conductors through which currents flow in opposing directions.

The fundamental principles of electrotechnology also include the fact that the flow of an electrical current within a conductor always generates a magnetic field around this conductor. This magnetic field is normally much more intense than the background, relatively weak, Earth's magnetic field and is superimposed on the latter. It is not therefore surprising that a compass which is installed in a vehicle in the vicinity of an electrically-heatable glazing unit, notably of course in the field of view of the driver of the vehicle in the vicinity of the windshield, is perturbed and/or deviated by the electrical magnetic field produced when the glazing unit is heated to such an extent that a reliable directional indication with respect to the Earth's magnetic field is no longer possible.

Of course, this effect of superimposition only happens in practice when the finished vehicle is put into service for the final customer, because this constellation is rather rare and the interference between the magnetic field of the electric heater and the Earth's magnetic field or the compass is not necessarily envisaged in advance.

One simple solution that could have been envisaged is to provide an opening within the heating region just in the area of the compass. However, in the case of glazing units with heating wires, such a measure represents in any case a significantly increased effort when the wires are installed. Indeed, in the case of an otherwise continuous installation of the heating region, the latter would need to be laid around the opened up area and would then be more densely disposed than elsewhere in the locations concerned. This would however result in special heated glazing units whose production would not be very economical owing to the relatively low number of vehicles equipped with a compass.

The heated glazing units with electrically-conducting coating tend to form "hot spots" in the presence of uniformity defects in the conducting coating (glazing unit transparent to radiation), in other words local over-heating at the edges of these uniformity defects, which are undesirable and which, in addition to this, may cause damage to the glazing unit in the long term, notably in the case of composite glazing units with thermoplastic adhesive layer.

It is known from the Patent DE 10 2004 038 448 B3 that glazing units provided with electrically-conducting structures can be used for absorbing and attenuating radar radiation. In contrast to the documents mentioned hereinabove, the structures do not normally have any current flowing through them or are not generally connected to a voltage source.

The Patent Application DE 101 26 869 A1 discloses a heated glazing unit with wires in which the two parallel collector conductors are disposed directly adjacent to one another close to an edge of the glazing unit, the heating wires running away while being isolated by means of the collector conductors further away from the edge.

SUMMARY

It should firstly be pointed out that the invention relates to all the variants of electrically-heated glazing units that may be envisaged, whether they be currently made of glass or plastic. More precisely, it relates here to monolithic glazing units fitted with a conducting heating structure disposed on their surface in the form of a layer, of a printed pattern (by screen printing process) or of wires or even of heating conductors embedded within the bulk of the glazing unit.

Composite glazing units comprising at least two rigid glazing units and an adhesive layer joining the latter by surface adhesion, notably vehicle windshields, are often encountered in a heated version. It is true that the heater in composite glazing units is generally embedded within the composite (here again with heating conductors in the form of a layer, of a printed pattern or of wires). But it is also of course possible to fabricate these composite glazing units with heating structures that are located on the outside (on one or both main surfaces).

Apart from that, it is clear these glazing units may not only be considered for automobile applications but also for their applications in buildings.

The object of the invention is to take measures in order to influence the magnetic field of an electrically-heatable glazing unit, which measures will notably allow operation of an apparatus sensitive to magnetic fields without interference, such as a compass or a sensor, in the vicinity of such a glazing unit.

According to the invention, this object is achieved with the features of claim 1. The features of the dependent claims indicate advantageous improvements of this invention.

The invention exploits the fact that a magnetic field, which is generated by a current in a conductor according to the "rule-of-thumb" rotating clockwise with respect to the direction of the current, can be compensated, at least partially, by the magnetic field from a parallel conductor through which a current flows in the opposite direction. This physical effect is not explicitly mentioned in any of the aforementioned documents, since these relate to completely different problems. However, it also occurs in cases where there are electrical conductors disposed in parallel adjacent to one another and through which opposing currents flow.

Thanks to an appropriate configuration of the heating conductors (which, in principle, run between two lateral edges of the glazing unit) within a limited region of the surface of the glazing unit behind which is disposed, or is to be disposed, an apparatus sensitive to magnetic fields such as a compass, but also other types of sensors, in particular devices integrated into satellite positioning systems, the effect of the magnetic field in the direction of this apparatus (in other words more or less perpendicularly to the plane of the glazing unit), if it is not totally eradicated, can be at least minimized. As opposed to the state of the art and according to the invention, these measures are taken within a partial region of the surface of the glazing unit and with a shape of glazing unit without the heating function per se being strictly necessary. The measures according to the invention are furthermore in no case comparable with a communication glazing unit of the type mentioned above.

The invention thus does not consist, as with the aforementioned state of the art, of a local control of the heating power or of an equalizing of the currents in heating conductors of various lengths, but exclusively of the greatest possible reduction in the magnetic field generated locally (perpendicularly to the plane of the glass) by the heating conductors at the location of an apparatus with whose operation it would otherwise interfere. If this is to be achieved on an industrial scale at a reasonable cost, a compromise must clearly also be found between a very high resolution compensation (for example with change of direction of the current from one heating wire to another beyond 2 neighbouring heating wires) and a solution in which a too intense magnetic field still "persists".

The same thing also clearly applies to the compensation of the magnetic fields that are generated by flat heating conductors in the form of coatings or strips of coating. Here, it is possible to produce in a manner known per se, by dividing the coating continuous per se (separation lines or areas, for example applied by laser processing), several parallel surface regions in which the direction of flow of the current is each time reversed.

Thus, in a partial region of the glazing unit that corresponds to the region in the vicinity of the apparatus sensitive to magnetic fields, the direction of current flowing in the heating conductors is reversed with respect to the direction of the current flowing in the other heating conductors situated on the glazing unit outside of this partial region.

With a large-scale grid patterning of the heating conductors through which currents flow in opposing direction, the magnetic field is already attenuated everywhere where two heating conductors or heating regions through which currents flow in opposing directions are located directly adjacent to one another. Accordingly, it is judicious to place this line of current reversal in the finished glazing unit at every location close to which it will later be required (in the mounted state) to install the apparatus sensitive to magnetic fields.

The expression "line of current reversal" here denotes a virtual line that runs in the plane of the glass in parallel with the heating conductors and on either side of which are current flows in opposing directions in neighbouring heating conductors. In the case of heating layers divided into strips, this line of current reversal is located in the separation line or surface each time between two parallel layer strips separated from one another.

It would seem particularly appropriate that at least two lines of current reversal of this type be located adjacent to one another within the region of the apparatus with a mutual gap which is determined as a function of the gap between the apparatus and the surface of the glass and, potentially, as a function of its own width. In particular, this gap, which may also be called width of the partial region of the glazing unit, or else separation distance between the heating conductors at each end of the partial region, corresponds to one to three times, and preferably corresponds to twice, the distance separating the apparatus from the glazing unit. It is thus possible to manage to compensate almost totally the magnetic field that acts on the apparatus above the region of the heating conductors that are located in the centre, in such a manner that the apparatus can principally detect the Earth's magnetic field at this location.

BRIEF DESCRIPTION OF THE DRAWINGS

Other features and advantages of the object of the invention will become apparent from the drawing of two exemplary embodiments and from their detailed description hereinbelow.

The figures show, in simplified views that are not to scale.

DETAILED DESCRIPTION

Figure 1:
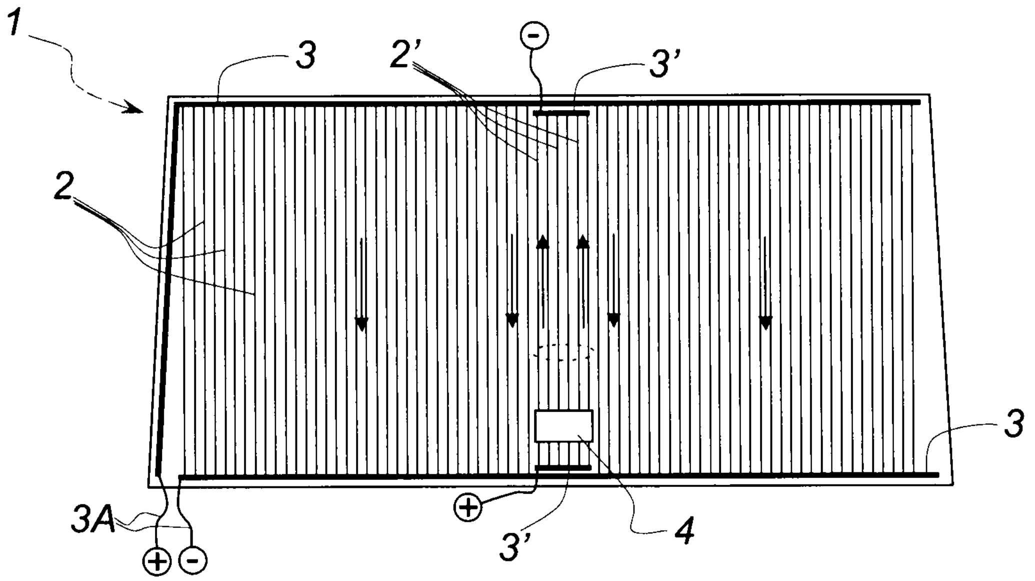
FIG. 1 a first embodiment of a glazing unit according to the invention in which three groups in total of heating conductors are formed whose central group has a current flowing in the opposite direction to the other two groups.

According to FIG. 1, a glazing unit 1, shown in a simplified manner in the form of a rectilinear trapeze, is equipped with a certain number of heating conductors 2 and with a pair of collector conductors 3 in addition to external terminals 3A for the application of a power supply voltage to the heating conductors 2. The latter are in the form of discrete thin conducting strips printed in parallel with one another or deposited in the form of wires. In the sense of this description, the heating conductors 2 form at least one "normal" heating region (here, there are two heating regions on the left and on the right of the centre of the glass).

Figure 4:
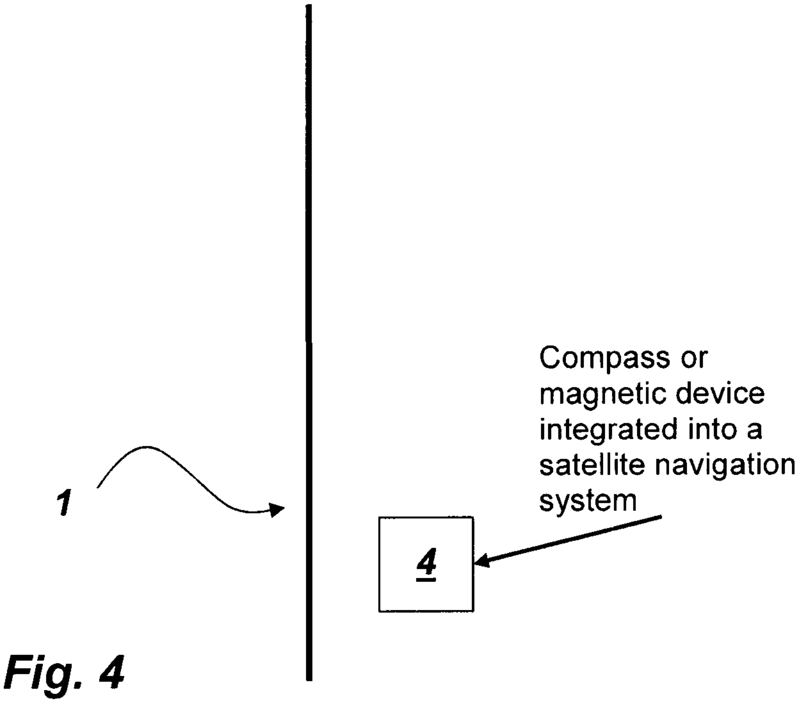
FIG. 4 a cross-sectional view of a glazing unit according to an embodiment of the invention.

In the assembled state, an apparatus 4 sensitive to magnetic fields is installed in the immediate vicinity of the glazing unit 1, as shown in FIG. 4, and here is located, in the direction of observation, at a short distance in front of the plane of the glass and approximately in the centre of the glass close to the lower edge. The actual mounting position of this apparatus 4 with respect to the glazing unit 1 is however of secondary importance for the present invention. The apparatus may thus also be mounted in the upper region of the glazing unit, for example in the mounting enclosure of an internal driving mirror in an automobile vehicle, and here again have a relatively small gap with respect to the glazing unit in the normal direction. In this variant, the apparatus is then at least indirectly fixed to the glazing unit and in a fixed position with respect to the latter.

In order to minimize the influence on the apparatus 4, for example a compass, of the magnetic field which is established when a heating current flows in the heating conductors 2 and which acts towards the outside, a group of heating conductors 2' (visually highlighted and grouped together by a dashed ellipse) is electrically insulated from the first pair of collector conductors 3 and thus from the "normal" heating regions formed from the heating conductors 2 and equipped with their own (second) pair of collector conductors 3'. The latter are fitted with their own external terminals which are set above the exterior collector conductors 3 (closer to the edge of the glazing unit) while being electrically insulated from the latter. On the left and on the right of this group of heating conductors 2', which is located approximately in the centre of the glass, are located two larger groups of heating conductors 2.

Plus and minus signs on the respective external terminals of the collector conductors 3 and 3' indicate the electrical polarities that are present on the pairs of collector conductors after the application of a heating voltage or after the activation of the heating current. It can be observed that the polarity of the heating conductors 2' is reversed with respect to that of the heating conductor 2. The directions of flow of the current which result from this are indicated by reversed arrows in the centre of the glazing unit 1. Lines of current reversal, in other words virtual lines parallel to the heating conductors 2 and 2', are seen to be running in the lateral edging regions (on the right and on the left) of the apparatus 4, on either side of which currents flow in opposite directions in the heating conductors 2 and 2'. The magnetic field generated by the heating conductors 2 and 2' is thus attenuated in the region of the lines of current reversal. These lines of current reversal enclose between them the two collector conductors 3'.

The reciprocal gap of the lines of current reversal on the surface of the glass, which gap also determines the amount of attenuation of the magnetic field, is dimensioned as a function of the conditions of the individual assembly situation, notably as a function of the dimensions of the apparatus 4 itself and of its gap with respect to the surface of the glass. Simple optimization tests and possibly simulations may be carried out for this purpose. In particular, this gap corresponds to one to three times, and preferably corresponds to twice, the distance separating the apparatus from the glazing unit.

The arrangement shown in FIG. 1—three heating regions connected in parallel—has the advantage that the heating voltage is everywhere the same, which allows all the heating conductors to be designed to be identical without modifying the local heating power. It has however the drawback of having to provide additional external terminals for the short collector conductors 3' in order to be able to connect to them a reverse polarity with respect to that of the collector conductors 3. Here, the two additional collector conductors 3' of the partial region are respectively placed close to the two longest edges of the glazing unit (longitudinal edges) and in the middle of these edges, the heating wires 2' running between these two collector conductors. The conductors 3' are preferably in the form of busbars that run parallel to the longest edges of the glazing unit.

It will be understood that, where needed, it would also be possible to provide more than one of such a group of heating conductors 2' fitted with collector conductors 3' and through which currents are flowing in the reverse direction. One practical example may be imagined in which the two collector conductors 3' in FIG. 1 are divided into several sections (at least two) disposed in longitudinal alignment and which are respectively at the same electrical potential. Only one external terminal is naturally required for this purpose, together with appropriate jumpers between the said sections. The "normal" heating conductors 2 pass through the spaces between these sections and are connected to the collector conductors 3. The number of current reversal lines is thus multiplied in a relatively simple manner. The aforementioned jumpers between the sections of the collector conductors 3'must of course be extended beyond these heating conductors 2 with a suitable insulator.

Figure 2:
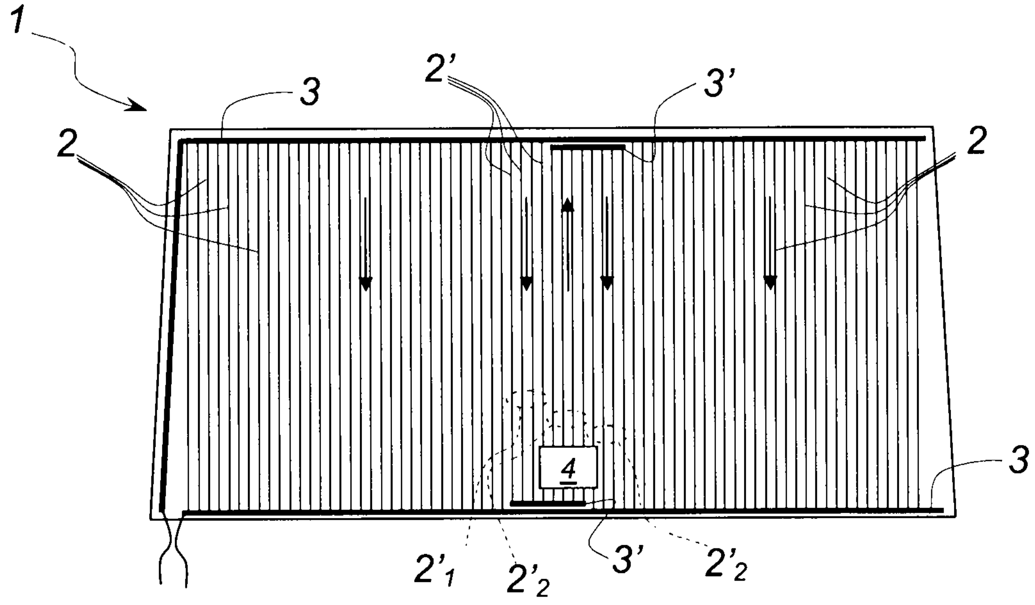
FIG. 2 a second embodiment in which five groups of heating conductors are formed three of which are electrically connected in series and which thus have currents flowing through them in the opposite direction.

FIG. 2 shows one variant of the configuration of the partial region of the surface using the same reference characters for the same elements as in FIG. 1. Five groups of heating conductors in total are formed here. This consists of two larger groups, respectively on the right and on the left of the centre of the glass (heating conductors 2, "normal" heating regions), which run directly between the collector conductors 3. In addition, three smaller groups of heating conductors 2' are formed (grouped together by dashed ellipses and denoted by $2'_1$, $2'_2$, and $2'_3$) and are electrically connected together in series starting from the top collector conductor 3. There are actually four parallel collector conductors 2' (group $2'_1$) running between the top collector conductor 3 and a short collector conductor 3'. The latter has no external terminal, but only serves as a jumper with the next group $2'_2$ in the series. The latter also comprises four heating conductors that run between the bottom short collector conductor 3' and a top short collector conductor 3', which has no external terminal either, to which four heating conductors (group $2'_3$) are in turn connected running as far as the bottom collector conductor 3. The changing directions of flow of the current are also represented by arrows in FIG. 2 in order to illustrate them. The collector conductors 3' are only used here as reversing jumpers for the current flowing in the series circuit.

This series circuit however forms a voltage divider in which the heating voltage available between the collector conductors 3 is reduced to partial voltages. In the absence of additional measures, in other words when the heating conductors 2' are designed to be identical to the heating conductors 2, this would lead to a reduction in the heating power in the region of the groups $2'_1$ to $2'_3$.

It will have to be decided, depending on the application and/or on the customer, whether this situation can be accepted with the benefit of the absence of additional external terminals on the collector conductors 3' or whether measures need to taken with a view to equalizing the heating power within the region of the voltage divider. The latter may be obtained by an appropriate application of Ohm's law by increasing the density of the conductors, by reducing the resistance of the conductors (thicker wires) or by comparable measures. When the groups $2'_1$ to $2'_3$ are in practice located around the centre of the windshield of a vehicle, slight restrictions in visibility caused, for example, by more densely set and/or thicker heating conductors/wires may also be tolerated within this region.

The rule that is also applicable to this configuration according to FIG. 2 is that it is in principle possible to add branches or additional groups $2'_x$ to the series circuit. Nor is it strictly necessary to form the series circuit with an even number of additional collector conductors 3'. However, if an odd number were used, the collector conductors 3 would then also have to be subdivided and fitted in pairs with separate external terminals, since the direction of flow of the current would then be oriented in the reverse direction in the two "normal" lateral heating regions (in contrast to the configuration in FIG. 2, the bottom collector conductor 3 cannot then be used as a common ground bus for all the groups of heating conductors or the heating regions).

Figure 3:
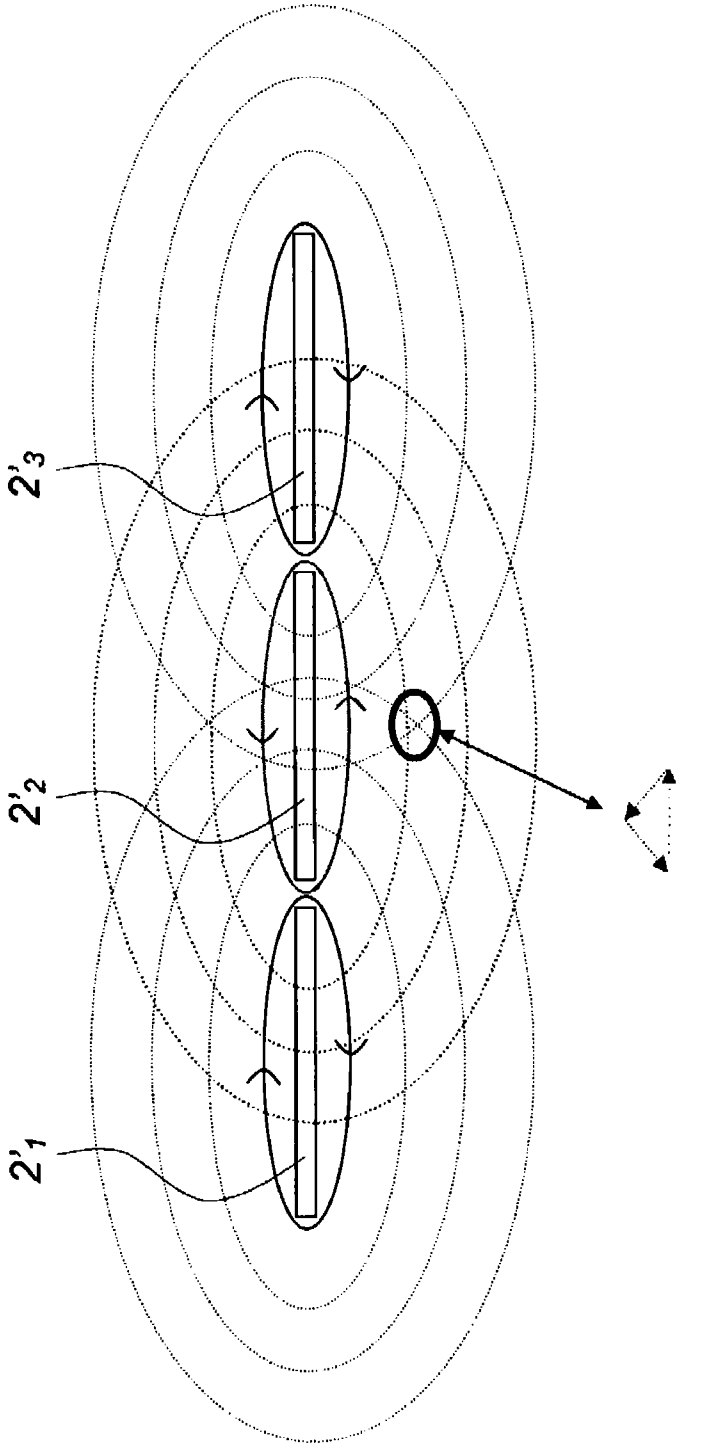
FIG. 3 a schematic representation of magnetic field lines that are generated around three heating conductors running parallel to one another.

FIG. 3 shows, in a highly simplified form, a cross section through three heating conductors $\mathbf{2'}_1$, $\mathbf{2'}_2$, and $\mathbf{2'}_3$ disposed in parallel (laid flat) adjacent to one another which are respectively surrounded by magnetic field lines. Whereas the magnetic field lines in the outer heating conductors $\mathbf{2'}_1$ and $\mathbf{2'}_3$ turn left, the magnetic field lines in the central heating conductor $\mathbf{2'}_2$ turn right. The detail encircled by an ellipse under the heating conductor $\mathbf{2'}_2$ and the vector arrows drawn underneath the latter clearly demonstrate that the magnetic fields can indeed mutually cancel one another within the region where the three magnetic field lines are superimposed. The vector arrows locally form a closed triangle. As a consequence, it is preferable that the apparatus 4 be installed near to this location or that this location in the heatable glazing unit bounded by the lines of current reversal previously described must preferably be disposed close to the mounting location of the apparatus within the complete assembly environment.

The invention claimed is:

1. An assembly comprising:

an electrically heatable glazing unit; and an apparatus sensitive to magnetic fields that is separate from the glazing unit and installed adjacent the glazing unit;

wherein the glazing unit includes a plurality of collector conductors that supply a plurality of heating conductors with an electric current used to heat up the heating conductors and the glazing unit, the plurality of collector conductors including a first pair of collector conductors and a second pair of collector conductors, wherein the first pair of collector conductors includes a first collector conductor and a second collector conductor disposed, respectively, along opposing longitudinal sides of the glazing unit, wherein the second pair of collector conductors includes a third collector conductor and a fourth collector conductor disposed, respectively, extending along the longitudinal sides of the glazing unit and parallel with the first and second collector conductors, the third and fourth collector conductors being disposed between the first and second collector conductors so as to be closer to a center of the glazing unit than the first and second collector conductors, and the third and fourth collector conductors being shorter in length than the first and second collector conductors so as to extend over a portion of the glazing unit less than a length of extension of the first and second collector conductors, wherein the apparatus is situated adjacent to a partial region of a surface of the glazing unit which region corresponds to the portion of the glazing unit over which the third and fourth collector conductors extend, the partial region including an arrangement of adjacent parallel heating conductors connected at ends thereof between the third and fourth collector conductors and in which current flows in an opposite direction to a direction of current in the heating conductors disposed across a part of the glazing unit outside of a periphery of the partial region, and wherein the arrangement of adjacent parallel heating conductors minimizes by mutual compensation or elimination a magnetic field acting locally within the partial region and perpendicularly to a plane of the glazing unit when the current flows.

2. The assembly according to claim 1, wherein at least two heating conductors with alternating current flow directions are provided within the arrangement of adjacent parallel heating conductors in the partial region of the surface of the glazing unit.

3. The assembly according to claim 1, wherein the second pair of collector conductors includes exclusive external terminals for supply of power to the arrangement of adjacent parallel heating conductors within the partial region of the surface, the second pair of collector conductors being configured to be exposed to a voltage, a polarity of which is reverse to a polarity of a voltage simultaneously applied to the first pair of collector conductors which is connected to heating conductors outside of the partial region.

4. The assembly according to claim 3, wherein the second pair of collector conductors of the partial region are busbars running parallel, respectively, to two longest edges of the glazing unit.

5. The assembly according to claim 1, wherein the second pair of collector conductors does not have exclusive external terminals, the second pair of collector conductors forming a series circuit composed of groups of heating conductors across a voltage applied to the first pair of collector conductors which is connected to heating conductors outside of the partial region.

6. The assembly according to claim 5, wherein the heating conductors within the groups of heating conductors of the series circuit exhibit electrical resistances of a total that at least is less than an electrical resistance of the heating conductors directly connected between the first pair of collector conductors.

7. The assembly according to claim 1, wherein the heating conductors are electrically-conducting layers, wires, and/or a screen printing design.

8. An apparatus comprising:

a vehicle including the assembly according to claim 1 installed therein.

9. The apparatus according to claim 8, wherein the glazing unit is a windshield of the vehicle and the apparatus sensitive to magnetic fields is a compass or a magnetic device integrated into a satellite navigation system.

10. The apparatus according to claim 8, wherein the apparatus sensitive to magnetic fields is affixed directly or indirectly to the glazing unit.

11. The assembly according to claim 1, wherein the apparatus is fixed at least indirectly onto the glazing unit in a tuned position on the partial region of the surface with attenuated magnetic field and at a given distance with respect to the surface of the glazing unit.

12. The apparatus according to claim 8, wherein the apparatus sensitive to magnetic fields is fixed onto the surface of the glazing unit turned towards an interior space of the vehicle.

13. The assembly according to claim 1, wherein a width of the partial region of the glazing unit, which is a separation distance between the heating conductors of each end of the partial region, corresponds to one to three times the distance separating the apparatus from the glazing unit.

* * * * *

UNITED STATES PATENT AND TRADEMARK OFFICE

CERTIFICATE OF CORRECTION

PATENT NO. : 8,669,493 B2
APPLICATION NO. : 12/520340
DATED : March 11, 2014
INVENTOR(S) : Marc Maurer et al.

It is certified that error appears in the above-identified patent and that said Letters Patent is hereby corrected as shown below:

On the title page, Item (73), the Assignee's name is incorrect.
Item (73) should read:

-- (73) Assignee: SAINT-GOBAIN GLASS FRANCE, Courbevoie (FR) --

Signed and Sealed this
Twenty-fourth Day of June, 2014

Michelle K. Lee
*Deputy Director of the United States Patent and Trademark Office*